UNITED STATES PATENT OFFICE.

CORNELIUS A. DONOVAN, OF ABILENE, TEXAS.

VERMIN-EXTERMINATOR AND PROCESS OF PREPARING THE SAME.

SPECIFICATION forming part of Letters Patent No. 355,599, dated January 4, 1887.

Application filed February 18, 1886. Serial No. 192,423. (No specimens.)

*To all whom it may concern:*

Be it known that I, CORNELIUS A. DONOVAN, of Abilene, in the county of Taylor and State of Texas, have invented a new and useful Improvement in Animal-Exterminators, of which the following is a specification.

My improved animal-exterminator consists of wheat or other grain saturated with a solution of strychnia in water, the grain afterward being coated with a solution formed of simple sirup and arsenic, a small quantity of oil of rhodium being applied to the grain thus prepared.

In carrying out my invention I take one gallon of grain—preferably of wheat—thoroughly clean it, and soak it in a solution formed of two drams of strychnia in twenty drams of water, and agitate it from time to time until the wheat is dry. I then take a solution formed by mixing two drams of arsenic with twenty drams of simple sirup, and apply it to the wheat and thoroughly agitate the wheat to cause it to be entirely covered with the sirup. I then allow the wheat to dry again, and put it up in convenient packages for use.

My improved animal-exterminator is designed more especially for the extermination of prairie dogs, and immediately before placing the exterminator in a position accessible to prairie dogs I add to the bulk of the wheat treated in the manner above described about fifteen drops of the oil of rhodium to render the wheat attractive to the animals.

Having thus described my invention, what I claim as new, and desire to secure by Letters Patent, is—

1. An animal-exterminator consisting of grain containing strychnia and having a coating of arsenic and sirup, as herein described.

2. The method herein described of preparing grain for exterminating animals, consisting in soaking the grain in a saturated solution of strychnia, drying the same, then mixing a solution of arsenic and sirup with it while being agitated, and finally drying the grain, as set forth.

CORNELIUS A. DONOVAN.

Witnesses:
J. J. MOODY,
S. A. HOWARD.